No. 846,473. PATENTED MAR. 12, 1907.
G. F. W. HOLMAN.
COFFEE POT.
APPLICATION FILED MAY 2, 1906.
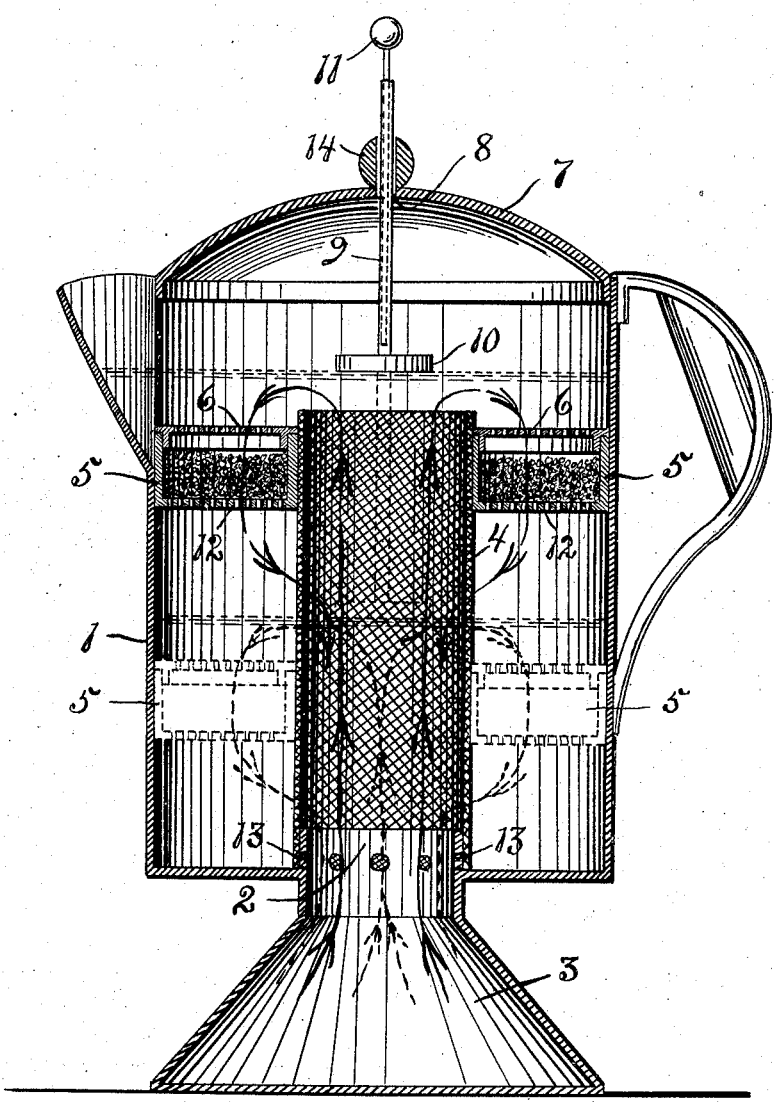
WITNESSES:
INVENTOR.
George F. W. Holman
BY
H. B. Schermerhorn
ATTORNEY.

UNITED STATES PATENT OFFICE.

GEORGE F. W. HOLMAN, OF PHILADELPHIA, PENNSYLVANIA.

COFFEE-POT.

No. 846,473.      Specification of Letters Patent.      Patented March 12, 1907.

Application filed May 2, 1906. Serial No. 314,740.

*To all whom it may concern:*

Be it known that I, GEORGE F. W. HOLMAN, a citizen of the United States, residing at Philadelphia, in the county of Philadelphia and State of Pennsylvania, have invented certain new and useful Improvements in Coffee-Pots, of which the following is a specification.

My invention relates to coffee-pots for making what is known as "boiled" coffee in distinction from what is termed "drip" or "percolated" coffee, the ground coffee in my improved pot being wholly submerged in the water during the entire process of boiling. While I here show and describe my invention for use in boiling coffee, it is understood that the invention is not restricted to such use, being available for general purposes of steeping and the extraction of juices.

My object is in the first instance to provide an apparatus whereby the principle of convection or circulation may be utilized in such manner that the ground coffee in the coffee-holder is removed and protected from the scalding effects of direct ebullition while the process of gradual infusion is in progress.

My object is, further, to provide a means whereby any desired quantity of boiled coffee from a minimum to the maximum capacity of the pot may be prepared, and, lastly, I have sought to provide a coffee-pot simple in construction, convenient in use, and effective in operation, having few parts and these readily adjustable and removable for the purpose of cleaning, and which shall do away with the employment of valves and other so-called "pumping" mechanism.

These objects I accomplish by the means herein described, and shown in the accompanying drawing, which is a view in vertical section of the entire coffee-pot.

The cylindrical body 1 of the pot is furnished with a base 3, preferably in the form of a truncated cone. The base and body are joined by a short cylindrical section 2, which rises somewhat above the bottom of the main body of the pot, the projecting portion of the cylindrical section 2 forming a collar pierced by the openings or perforations 13. Thus the main body 1, the cylindrical section 2, and the base 3 form one continuous water-tight receptacle.

The inner tube or cylinder 4 is of wire-gauze or perforated sheet metal and fits tightly over the projecting collar of the cylindrical section 2 above described, being thereby supported vertically in the center of the main body of the pot.

The annular coffee-holder 5 in the form of a cored cylinder is of such diameter as to fit within the body of the pot and around the inner tube 4. The cover 6 and bottom 12 of the coffee-holder are of wire-guaze or perforated sheet metal, and the sides thereof may be either imperforate, as shown, or of the same character as the cover and bottom.

The cover 7 of the pot is of ordinary form and is provided with the centrally-located opening 8, in which is mounted the telescopic rod 9. This rod is furnished at its lower end with a light wood or cork float 10 and at its upper end with a small ball or other indicator 11, the whole constituting what I term a easily "bobber," being adapted to rise and fall in the opening 8 in the top of the cover 7.

The mode of operation of my improved coffee-pot is as follows: The central tube or cylinder 4, which is removable for the purpose of cleaning, is fitted into position upon the collar of the cylindrical section 2. The coffee-holder 5 is filled with the ground coffee, is covered, and the holder slipped over the top of the tube 4 and pushed downward thereon, the vertical adjustment being in accordance with the quantity of boiled coffee to be made. The pot is filled with water to a point covering the top of the coffee-holder 5, and the telescopic rod 9 of the bobber is then adjusted so as to permit the float 10 to rest upon the surface of the water in the pot. Heat being then applied at the base 3, convection ensues, the heated water rises through the central tube 4, passes over its top, thence downward through the ground coffee in the holder, and into the annular space surrounding the central tube 4. The cooler water from this annular space passes through the meshes of the tube 4 and down toward or into the base 3. This circulation or convection, due to the difference of temperature at all moments between the water in the base 3 and central tube 4 and the water in the annular space surrounding the tube 4, continues not only until the water in the base 3 and tube 4 reaches a state of ebullition, but for the further time of boiling necessary to make the coffee infusion of proper strength.

In the accompanying drawing the coffee-holder 5 is shown in full lines at its highest position, or, in other words, adjusted for the maximum capacity of the pot. The course of circulation above described and for this position of the holder is indicated in the drawing by the arrows in solid line. When the coffee is boiled and ready to serve, the central tube 4 and coffee-holder 5 may be drawn up together and removed from the pot.

It will be observed that at whatever point upward or downward upon the central tube 4 the coffee-holder 5 is adjusted for the purpose of varying the quantity of boiled coffee to be made, as above described, and whatever the consequent level of the water in the pot a free circulation of the boiling water is secured through this perforated or wire-gauze tube. For example, a lower adjustment of the coffee-holder 5 is indicated in dotted line in the drawing. In this case the boiling water rising by convection in the central tube passes through the meshes or perforations thereof upon reaching the level of the water in the pot instead of passing over the top of the tube, as in the high position shown and previously described. The course taken by the water in circulation is indicated for this lower position by the dotted arrows in the drawing. Thus any lesser amount of boiled coffee than the maximum may be made by locating the coffee-holder upon the central tube 4 at such a height above the bottom of the pot that when the desired quantity of water is in the pot the water-level will be somewhat above the cover of the coffee-holder. The openings 13 in the projecting collar of the cylindrical section 2 at the bottom of the main body of the pot are provided for a free convection of water down into the base 3 when the coffee-holder is at its lowest position for making the minimum amount of boiled coffee.

It remains to describe the function of what I term the "bobber." In boiling coffee it is important to ascertain the moment when the boiling-point is initially reached and ebullition takes place, for the length of time for which the coffee is to be boiled must be reckoned from that moment. As previously stated, the float 10 rests upon the surface of the water, the telescopic rod 9 passing up through the opening 8 in the cover 7 and knob 14 and being shortened or lengthened according to the level of the water in the pot. When the boiling-point is reached and ebullition takes place, the disturbance of the surface causes a rising and falling of the float, which motion is communicated by the rod to the ball or indicator 11, projecting above the cover of the pot. The desired length of boiling can thus be timed from the first movement of the bobber 11, and the exact beginning, duration, and energy of boiling is thus indicated without necessitating a removal of the cover.

It will be observed that there is no false bottom in my improved pot and no pressure-chamber or pressure-tube, pressure not being employed in producing or maintaining circulation. While I have shown the base 3 as having the form of a truncated cone, it may be of any shape which will leave an air-space between its upper surface and the bottom of the main body of the pot.

I have illustrated and described with particularity the preferred details of construction and arrangement of the several parts; but it is to be understood that changes may be made and essential features of my invention be retained.

I do not claim, broadly, an apparatus wherein for purposes of steeping there is established a circulation of the water from a heating-base upward through a central tube and downward through the substance to be steeped, as I am aware that a variety of apparatus exist wherein this principle is employed.

What I claim as my invention, and desire to secure by Letters Patent, is—

In a steeping apparatus, a pot-body, a heating-base exterior thereto, an annular collar connecting said pot-body and heating-base and projecting above the bottom of said pot-body, said projecting portion being provided with a plurality of openings immediately above said bottom, an open-topped central tube, reticulated throughout its length and removably mounted upon the projecting portion or neck of said annular collar, and a reticulated annular receptacle for the substance to be steeped, mounted and adjustable at any desired height upon said central tube, whereby the contents of said receptacle may be immersed and circulation by convection secured at varying levels of the liquid in said pot-body, substantially as and for the purposes described.

In testimony whereof I affix my signature in presence of two witnesses.

GEORGE F. W. HOLMAN.

Witnesses:
  LAURA BERGER,
  H. B. SCHERMERHORN.